United States Patent [19]
Wicklund et al.

[11] Patent Number: 6,088,359
[45] Date of Patent: Jul. 11, 2000

[54] ABR SERVER

[75] Inventors: Göran Wicklund, Nacka; Magnus Buhrgard, Bromma, both of Sweden

[73] Assignee: Telefonaktiebolaget LM Ericsson, Stockholm, Sweden

[21] Appl. No.: 08/891,232

[22] Filed: Jul. 11, 1997

[51] Int. Cl.[7] .................................................. H04L 12/28
[52] U.S. Cl. .......................... 370/395; 370/230; 370/233
[58] Field of Search ................................... 370/230, 229, 370/231, 232, 233, 234, 253, 395, 397, 398, 410, 412, 236

[56] References Cited

U.S. PATENT DOCUMENTS

| | | | |
|---|---|---|---|
| 5,339,318 | 8/1994 | Tamaka et al. | 370/110.1 |
| 5,367,520 | 11/1994 | Cordell | 370/60 |
| 5,414,701 | 5/1995 | Shtayer et al. | 370/58.2 |
| 5,418,786 | 5/1995 | Loyer et al. | 370/94.2 |
| 5,420,858 | 5/1995 | Marshall et al. | 370/60.1 |
| 5,440,552 | 8/1995 | Sugita | 370/60 |
| 5,455,825 | 10/1995 | Lauer et al. | 370/60 |
| 5,467,349 | 11/1995 | Huey et al. | 370/60.1 |
| 5,481,687 | 1/1996 | Goubert et al. | 370/58.2 |
| 5,483,526 | 1/1996 | Ben-Num et al. | 370/60.1 |
| 5,504,743 | 4/1996 | Drefenstedt | 370/60.1 |
| 5,515,359 | 5/1996 | Zheng | 370/13 |
| 5,521,917 | 5/1996 | Watanabe et al. | 370/1 |
| 5,530,698 | 6/1996 | Kozaki et al. | 370/60.1 |
| 5,530,806 | 6/1996 | Condon et al. | 395/185.02 |
| 5,546,377 | 8/1996 | Ozveren | 370/13 |
| 5,555,256 | 9/1996 | Calamvokis | 370/60.1 |
| 5,572,522 | 11/1996 | Calamvokis et al. | 370/60.1 |

FOREIGN PATENT DOCUMENTS

| | | |
|---|---|---|
| 0 743 803 | 11/1996 | European Pat. Off. . |
| 2 301 913 | 12/1996 | United Kingdom . |
| 2 301 985 | 12/1996 | United Kingdom . |

OTHER PUBLICATIONS

IBM Technical Disclosure Bulletin, vol. 35, No. 3, "Connectionless ATM Network Support Using Virtual Path Connections," pp. 445–448, Aug. 1992.

IBM Technical Disclosure Bulletin, vol. 36, No. 1, "Combined Translation Lookaside Buffer for Page Frame Table and Translation Control Word Entries," pp. 240–242, Jan. 1993.

IBM Technical Disclosure Bulletin, vol. 38, No. 11, "Fast Technological Update in Asynchronous Transfer Mode Networks," pp. 359–360, Nov. 1995.

IBM Technical Disclosure Bulletin, vol. 39, No. 1, "Method for High–Speed Swapping of Asynchronous Transfer Mode Virtual Path Identifier/Virtual Channel Identifier Headers," pp. 225–228, Jan. 1996.

Langlois, P., "Making The Most Of ATM With UTOPIA", Telecommunications, vol. 29, No. 8, Aug. 1995, pp. 31–32.

*Primary Examiner*—Michael Horabik
*Assistant Examiner*—Binyam Tadesse
*Attorney, Agent, or Firm*—Nixon & Vanderhye P.C.

[57] ABSTRACT

A packet-based transmission system is disclosed in which resource management packets containing cell rate information are processed at a single ABR server. The server receives forward resource management packets and routes them without modification to their destination. The server also receives reverse resource management packets which it processes by updating their corresponding cell rate information based, for example, on cell rate information received from the forward cells.

10 Claims, 9 Drawing Sheets

Fig. 2 *(Prior Art)*

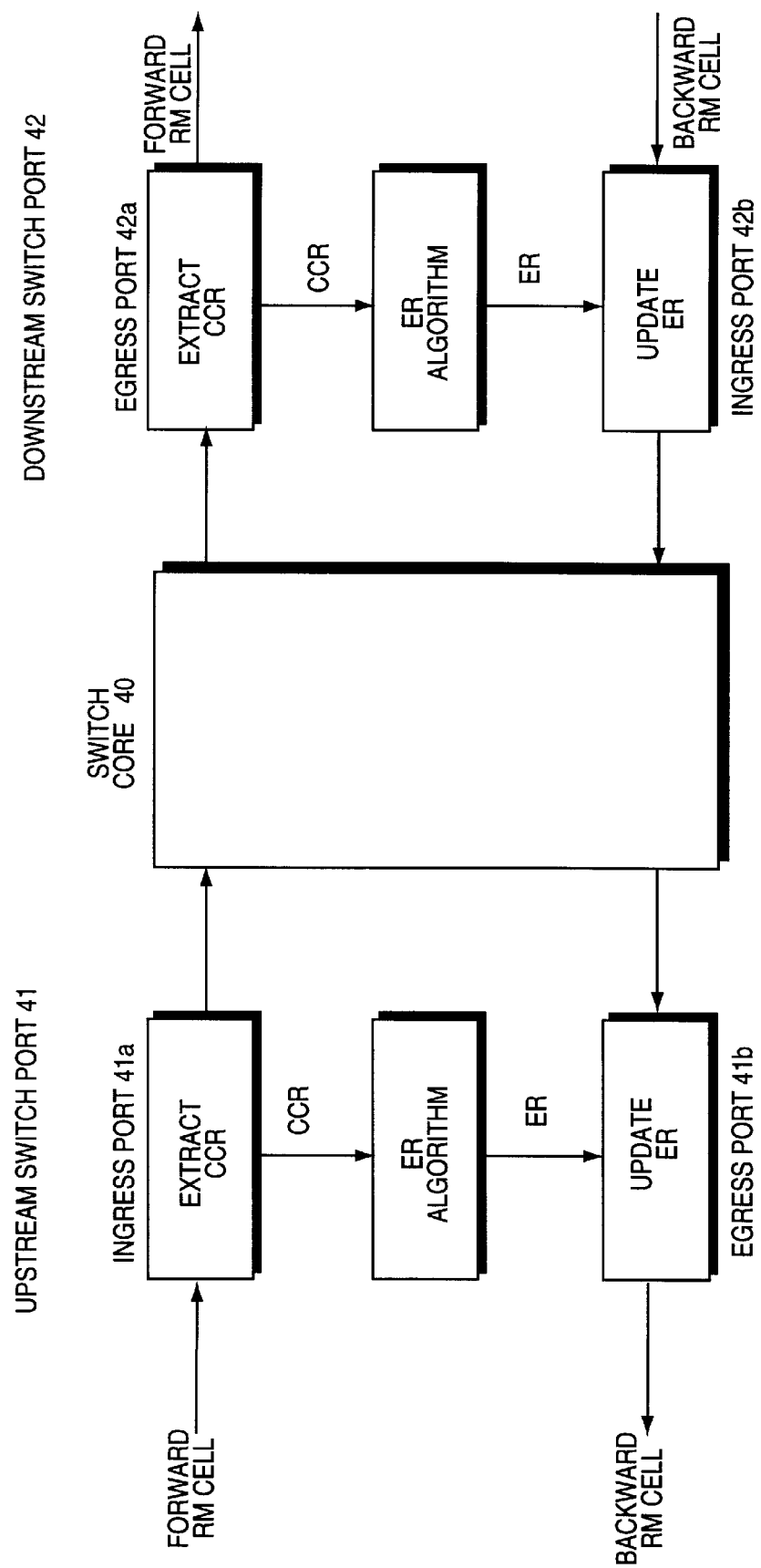
Fig. 4A *(Prior Art handling of RM cells)*

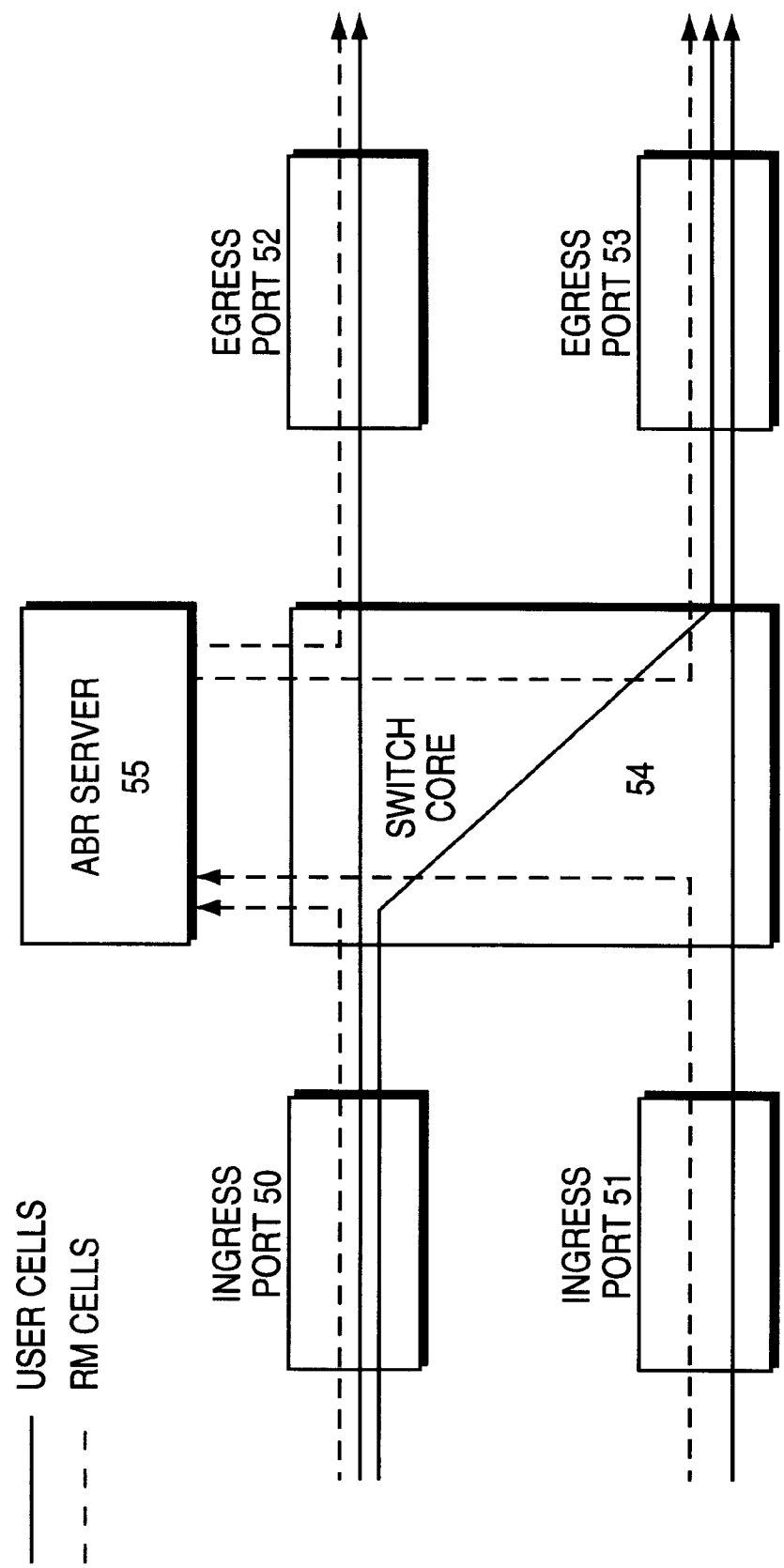

ABR SERVER

This application is related to the following (all of which are incorporated herein by reference): U.S. patent application Ser. No. 08/893,391, entitled "VC MERGING FOR ATM SWITCH", filed Jul. 11, 1997; U.S. patent application Ser. No. 08/890,758, U.S. Pat. No. 5,963,553 issued Oct. 5, 1999 entitled "HANDLING ATM MULTICAST CELLS", filed Jul. 11, 1997 now issued as U.S. Pat. No. 5,963,353 on Oct. 5, 1999; U.S. patent application Ser. No. 08/870,758, entitled "A DATA SHAPER FOR ATM TRAFFIC", filed Jul. 11, 1997; and U.S. patent application Ser. No. 08/893,576, entitled "VP/VC LOOK-UP FUNCTION", filed Jul. 11, 1997.

FIELD OF THE INVENTION

The present invention relates to communication networks and more particularly to servers for cell rate control in, for example, ATM networks.

BACKGROUND OF THE INVENTION

An ATM transmission is shown in FIG. 1 as a cell stream 10 composed of a series of cells 11. In the standard ATM format, each cell is comprised of 53 octets, of which 5 octets comprise the header 12 and 48 octets comprise the information field 14. As shown in FIG. 1, the header 12 includes routing information identifying how the header 12 and information field 14 are to be routed as an ATM transmission.

A standard cell header for a user-to-network interface is shown in FIG. 2. As shown, the header 12 comprises 5 octets. The cell header 12 is divided into various sub-headings according to the following nomenclature:

GFC Generic Flow Control
VPI Virtual Path Identifier
VCI Virtual Channel Identifier
PTI Payload Type Identifier
CLP Cell Loss Priority
HEC Header Error Control The generic flow control, payload type, cell loss priority, and header error control sub divisions of the header 12 have known functionalities to those of ordinary skill in the art.

FIG. 3 shows a prior art transmission path 30 for an ATM transmission. The ATM transmission path supports virtual paths VP31, VP32, and VP33 (plus or minus any number of additional virtual paths). Each virtual path 31–33 begins at a beginning point within the transmission path 30 and ends at an ending point somewhere along the transmission path 30. Within each of the virtual paths is a number of virtual channels, VC35, VC36 and VC37 (plus or minus any number of additional virtual channels).

Referring again to FIG. 1, each header 12 contains information identifying how the cell 11 associated with the header 12 will be routed through the transmission path 30, and specifically through the virtual channels (VC) and virtual paths (VP) of FIG. 3. The header fields which provide this routing information are the virtual path identifiers and virtual channel identifiers of FIG. 2, which tell the switching circuits within the transmission path 30 which virtual paths and virtual channels the particular cell 11 is to be routed through.

Within the above-described ATM context, the presently preferred embodiments of the invention are realized. Specifically, this preferred embodiment relates to a particular type of server category defined by the ATM Forum as "ABR." ABR is a protocol between an ATM network and user terminals to control the cell rate of each connection, in order to avoid overload in the network. The protocol is carried in special Resource Management cells that are inserted in the user cell stream (FIG. 4b) at regular intervals.

Several different service categories have been defined by the ATM forum. Constant Bit Rate, CBR, is used for real time applications with constant bit rate, e.g. telephony and other audio services. A maximum delay for CBR cells must be guaranteed by the network. For Variable Bit Rate, VBR, a maximum and a sustainable bit rate is defined, i.e., a source may send cells at the maximum bit rate for some defined maximum time, but the mean over a longer time must not exceed the sustainable bit rate. Two VBR categories are defined: one real time, with a maximum delay requirement, and one non-real time.

The idea with ABR is to use the bandwidth left over after CBR and VBR cells have been served, and distribute this bandwidth fairly among the active connections. ABR provides a flexible and efficient traffic service for, in particular, datacom applications. It has LAN-like performance in terms of shared medium properties and assured fairness of the available bandwidth. A user should be able to start up at a high predefined rate any time without any start-up delay and, when a node is congested, the network will tell the sources to decrease their rate, or increase the rate if there is bandwidth available.

Cell Delay Variation (CDV) is not controlled in this service and it is therefore not intended to support real-time applications. On the establishment of an ABR connection, the user specifies to the network both a maximum required bandwidth or Peak Cell Rate (PCR) and a minimum usable bandwidth or Minimum Cell Rate (MCR). The network must guarantee a bandwidth of at least MCR and the user should not send cells at a rate that exceeds PCR.

The basic technique for the network to control the source transmission rate is by telling it the maximum rate it can send at and not overload the network. ATM Forum has defined a source, a switch and a destination behavior for ABR as shown in FIG. 4b. The sources send Resource Management (RM) cells and the destinations will turn around them. Three levels of switch behavior are defined.

The simplest form is the binary, or EFCI (Explicit Forward Congestion Indication) switch, that sets the EFCI bit field in the cell header of a traffic cell when the switch is near congestion. The destination will then turn around the indication to the source by setting the Congestion Indication (CI) bit in the RM cell.

The relative rate switch will set the CI bit directly in backward RM cells, instead of setting the EFCI bit in forward cells. This will speed up the time from when a switch gets congested until the resources are notified.

The third, and most advanced, type of switches is the Explicit rate switches that updates the Explicit Rate (ER) field of the backward RM cells with a computed fair rate. A source will decrease its rate continuously for every cell sent and when receiving an RM cell the output rate is set to the one in the ER field, or increase it with a predefined factor if CI=O. A source will inform the network of its Current Cell Rate, CCR, in a field in the forward RM cell. At start up, a source will use a predefined Allowed Cell Rate, ACR.

The rate based approach will support all these types of switches and make it possible for them to coexist in a network. The binary and relative rate switches will not affect too much on performance if there are only a few layers of them but an ABR network based on only EFCI switches will have certain drawbacks. Given the same level of congestion at all the switches, connections traveling more hops have a higher probability of having their EFCI bit set than those traveling a smaller number of hops. This results in connections with many hops having very few opportunities to increase their rates and consequently their throughputs are starved. Another problem is that it may take several round trips before the sources have decreased their rate enough and hence larger buffers will be required (compared to a network with ER switches).

The switch vendor decides how to mark RM cells so as to achieve the least buffer requirement, the best link utilization, maximum fairness and maximum responsiveness.

In FIG. 4b, the source 43 performs certain operations, including sending forward RM cells every $N_m$ cell. The source 43 can also decrease the rate continuously, or it can increase the rate additionally when a backward RM cell is received with a Congestion Indicator=0 or set the rate to receive the Explicit Rate.

The switch 44 has certain options during congestion. It can set the EFCI-bit in forward RM cells, set the CI-bit in backward RM cells, and set the Explicit Rate field in the backward RM cell (set to "fair share" in the switch).

Finally, the destination 45 performs certain operations, including looping back the RM cells by setting the "forward" indicator to "backward" in the cell. It can also set the CI to the EFCI value of the latest received cell.

The ATM Forum thus defines two types of Resource Management cells: forward Resource Management cells and backward Resource Management cells. Forward Resource Management cells are sent in the same direction as the user cell stream (FIG. 4b), i.e. from a source to a destination. The forward Resource Management cells carry information about the current cell rate that can be extracted by a switch 42 and 44 along the path. These forward cells are used in calculating the explicit cell rate.

The backward Resource Management cells are sent in the reverse direction, but along the same virtual path, i.e., passing the same switching nodes. The backward cells are sent from the destination once the destination has received a forward RM cell. The explicit cell rate is inserted in the backward Resource Management cells for delivery to the source. When the source receives a backward Resource Management cell containing the explicit cell rate, it will adjust its rate to the value identified in the backward Resource Management cells.

FIG. 4a illustrates a prior art ABR implementation. The Figure shows a switch core 40 to which two switch ports 41 and 42 are connected (there could of course be many more switch ports connected to the core). Each switch port is divided into an ingress port 41a and 42b and an egress port 42a and 41b. Cells arrive from an external link to an ingress port, are switched through the switch core to an egress port and then transmitted out on a link. An ABR connection will have a forward direction and a backward direction. User cells and forward RM cells will enter the ingress part of an upstream switch port and exit through the egress part of a down stream port. Backward RM cells will enter the ingress part of a downstream switch port and exit through the egress part of an upstream port. The terms upstream and downstream are defined per connection (i.e., a switch port is upstream for some connections and downstream for other connections).

In a prior art implementation, the upstream and downstream switch ports execute the ABR ER algorithm independently based on local information only (queue status in the port itself and the CCR values from forward RM cells). A backward RM cell will first pass the downstream switch port and then the upstream port, and may be modified by both ports.

Different algorithms have been defined for calculating the explicit rate value: EPRCA, CAPC-2, ERICA +, etc. They differ in their complexity and efficiency. A common feature is that they make use of the current queue length in the switch when calculating the explicit rate value (and other values as well).

SUMMARY OF THE INVENTION

The present invention provides a method to support explicit rate ABR in an ATM switch by using a centralized server that makes all the required calculations based on information received from the ingress and egress ports of the switch.

With the present arrangement, the server will have access to all required information and can make calculations based on this global total information. New and more advanced algorithms can be implemented by replacing, or reprogramming, the server only, i.e., leaving the switch ports as they are.

In addition, according to the preferred embodiment, the Resource Management cells need not be switched along the same route as are the user cells and will thus experience longer or shorter delays. By ensuring that the delay for Resource Management cells is shorter (higher priority than the user cells), the ABR control loop will be advantageously shorter.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIGS. 1 through 4a and 4b are prior art depiction's of ATM technology;

FIGS. 5 and 5a are schematic diagrams of one example embodiment of a transmission system according to the present invention;

DETAILED DESCRIPTION OF THE PRESENTLY PREFERRED EMBODIMENT

An example transmission system according to the present invention is shown in FIG. 5, with some connections indicated.

Figure 1:
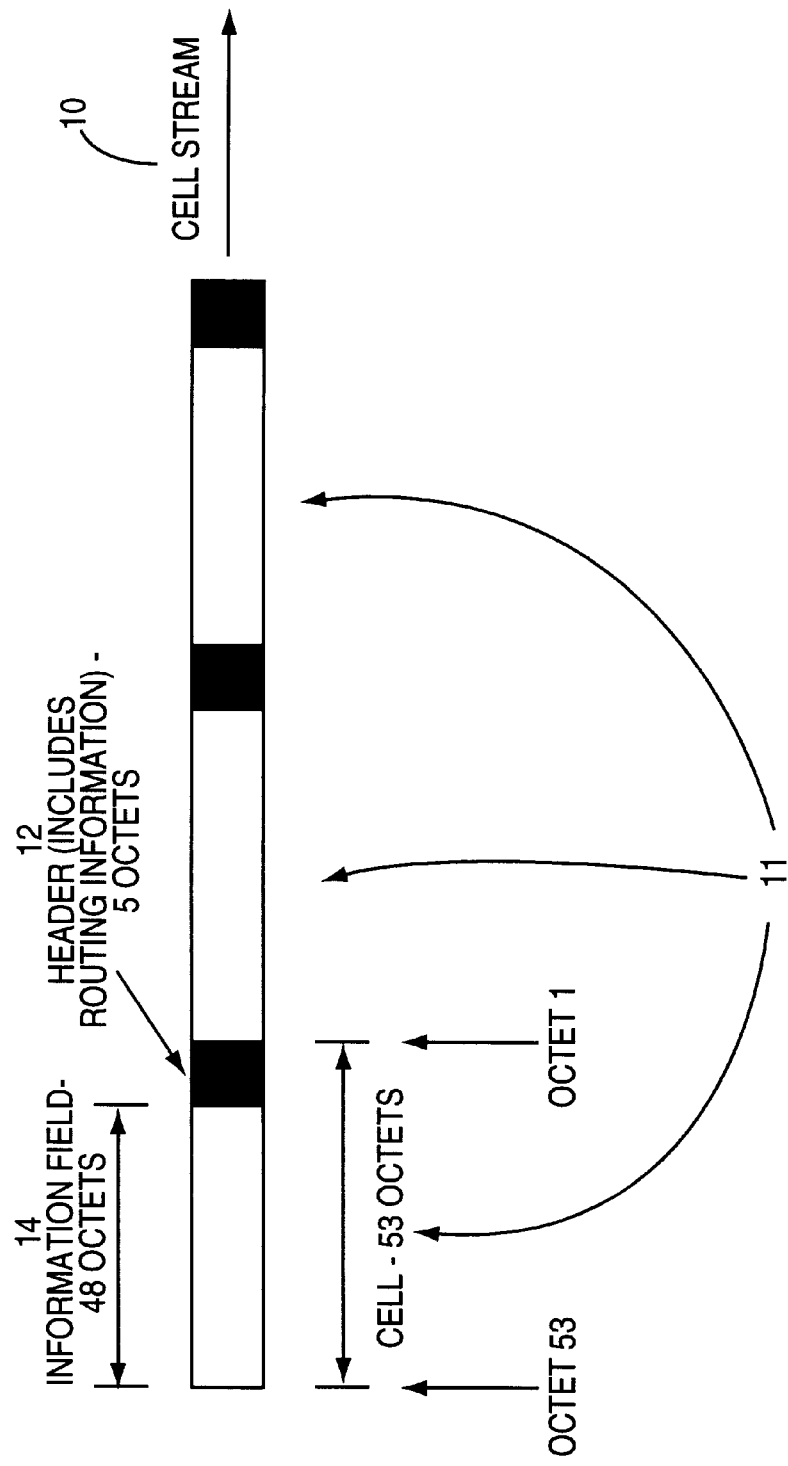
Figure 2:
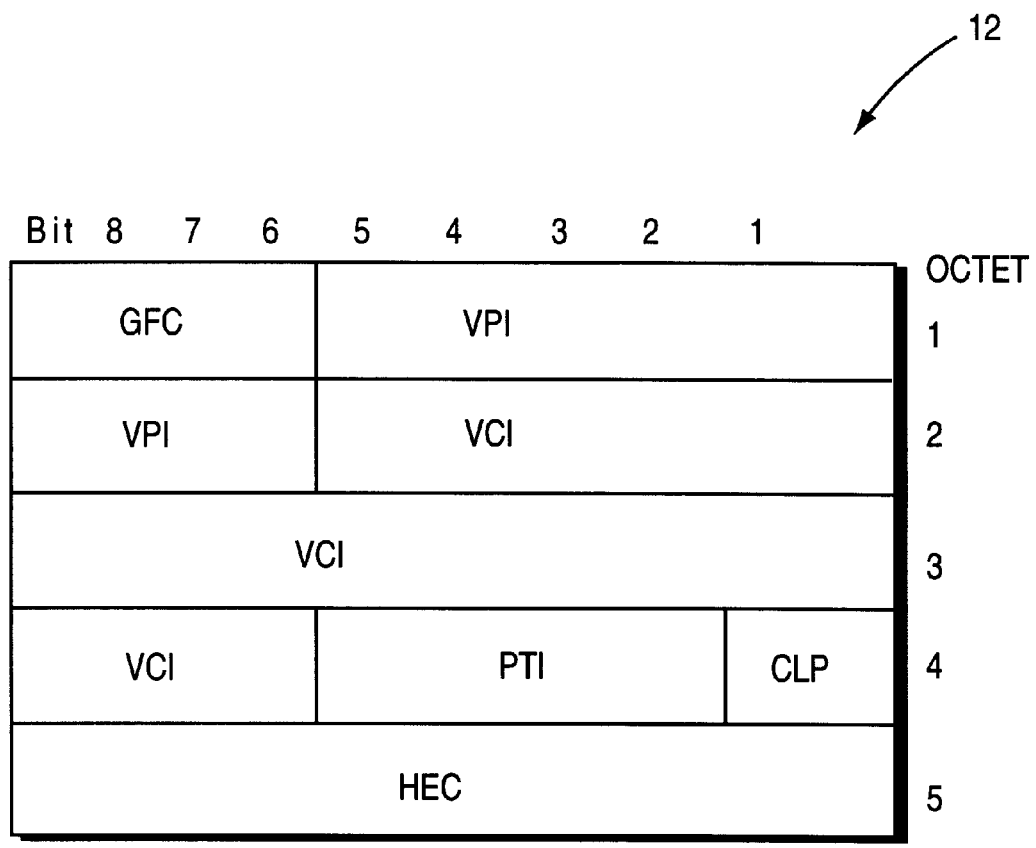
Figure 3:
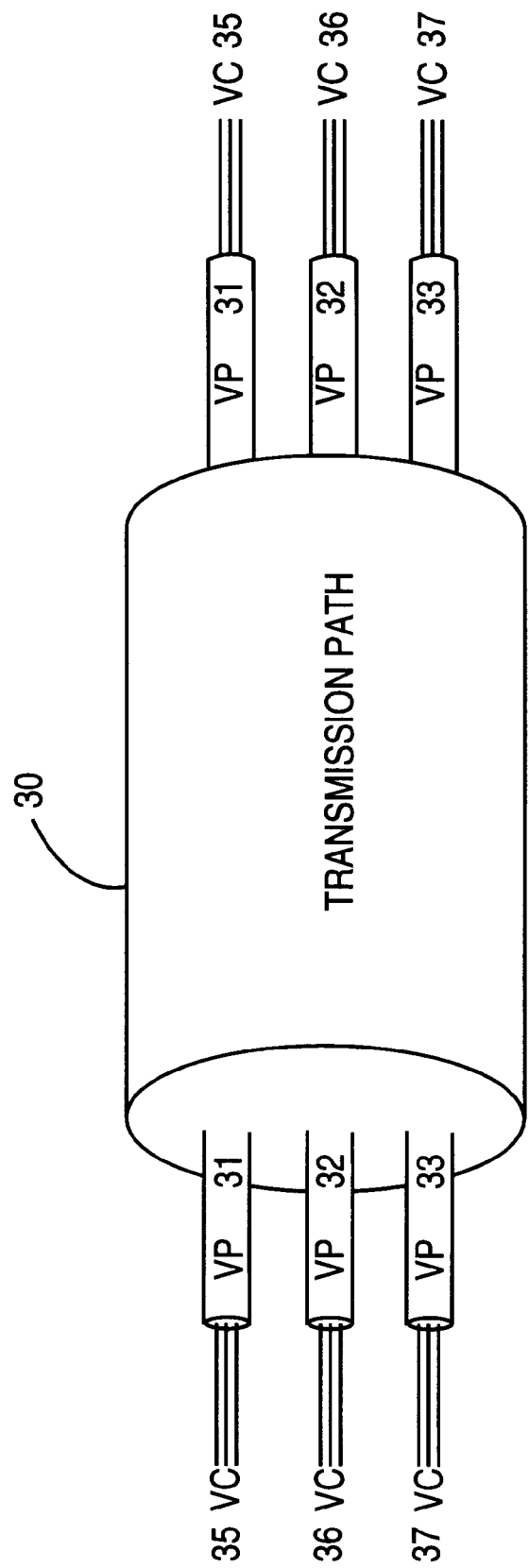
Figure 4B:
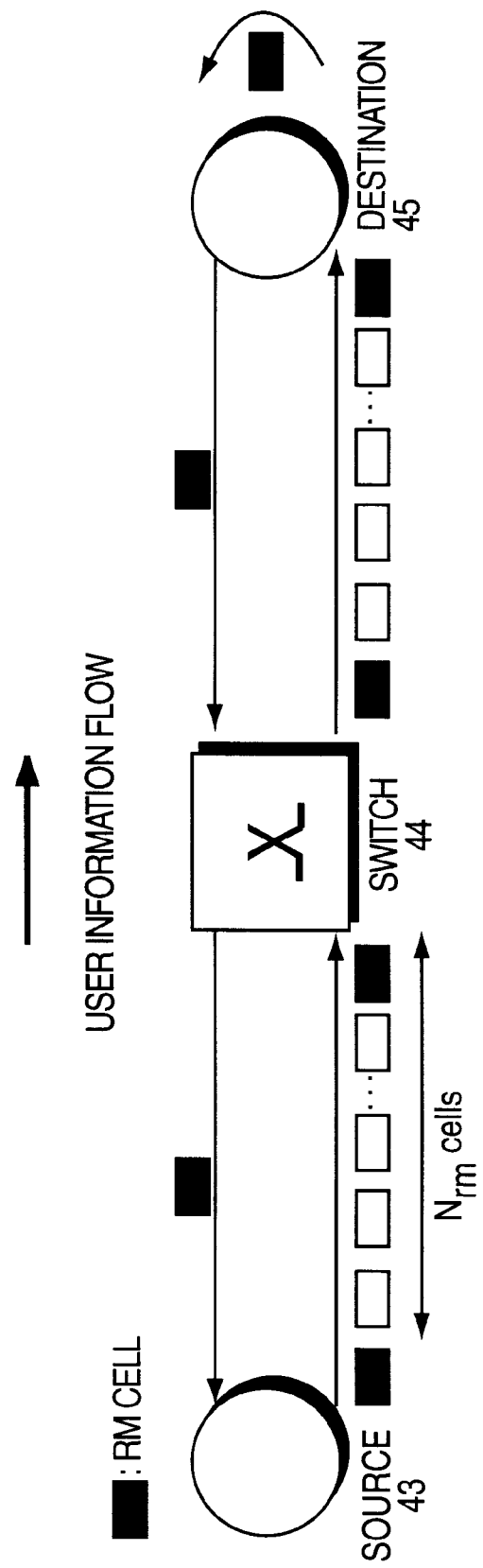

The transmission system shown in FIG. 5 illustrates the progress of user cells (indicated by solid lines) and resource management cells (indicated by dashed-lines) through a portion of an ATM network. More specifically, a typical user cell will be created by a user application and then placed onto the ATM network at an ingress port (50 or 51). It then passes through a switch core 54 which switches the cell to an appropriate egress port (52 or 53) for reception by another user application. The stream of cells that passes through the transmission system of FIG. 5 can be similar to that shown in FIG. 1, with each cell 11 having a standard header format such as is shown in FIG. 2. Of course, the content of the header 12 for resource management cells, as opposed to user cells will be different, as described in greater detail below.

Figure 5A:
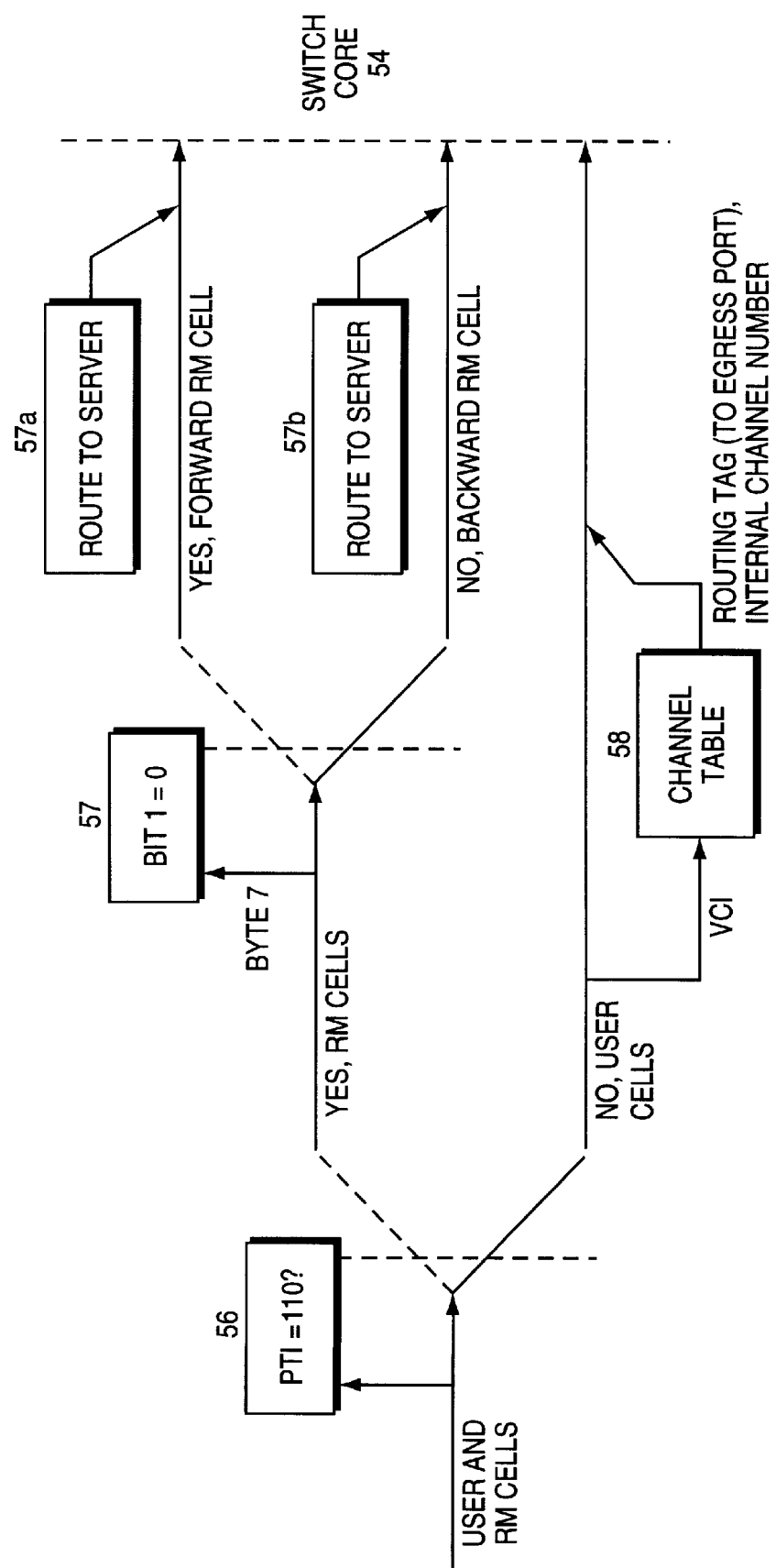

As shown in FIG. 5, ingress port 50 receives one virtual channel of user cells and resource management cells as one stream. The ingress port 50 then uses the PTI value in the cell header and the forward/backward indication in the RM payload to separate this single cell stream into three separate streams: user cells, forward RM cells and backward RM cells. Thus, for example, FIG. 5a shows a cell stream entering an ingress port 50, where the PTI value is checked at step 56. If the PTI value indicates the presence of RM cells (for example, PTI=110), the RM cells are tested at step 57 to determine if they are forward (first bit in seventh byte=0) or backward (first bit in sevenths byte=1). They are then routed at steps 57a and 57b according to their forward/backward status. On the other hand, if the PTI value at step 56 indicates that a cell is a user cell, it is assigned a route to an egress port via a virtual channel at step 58. The switch core 54 then looks at the routing tags assigned to the RM and user streams and switches them through based on their respective tags.

Functionality at the Ingress Port

At the ingress port 50, 51, resource management cells must be identified and switched to the ABR server. That is, since the resource management cells will be routed to the server 55, they must be identified as such before the switch core 54 receives them.

If a cell is not an Resource Management cell, the VPI/VCI values (FIG. 2) carried in it will be translated into an internal channel number, and then switched to an egress port 52, 53 given by data in a look-up table.

On the other hand, the Resource Management cells are all switched to the ABR server 55 via a pre-defined, semi-permanent internal virtual channel.

Figure 7:
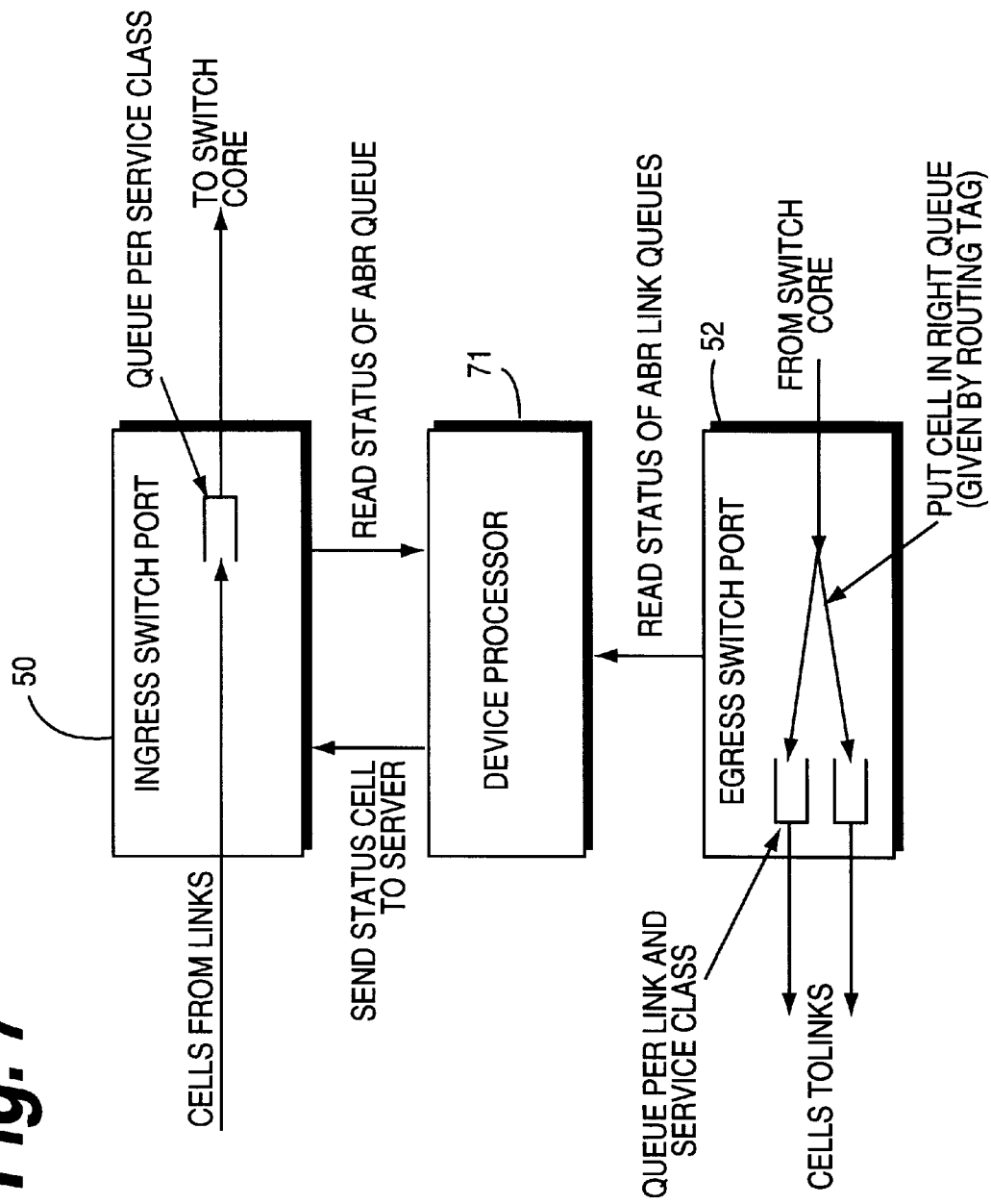
FIG. 7 is a schematic diagram of an example interaction between a processor and the ingress and egress ports according to the invention.

The ingress ports 50, 51 also must read out status information for delivery to the server 55. That is, the server must be informed at regular intervals about the status of the ABR service class queues, both at the ingress port and at the egress port (for each link). At the ingress side, the total number of ABR cells queued is supervised. As shown in FIG. 7, a micro-processor 61 reads the status from the ingress port 50 at regular intervals, and puts this status in a special cell that is sent to the server on a separate connection. The processor also reads the ABR link queue status from the egress port 52.

For example, in a 10 Gbit/s system, about 1,500 cells will be received each millisecond, if all links carry 100% ABR traffic. The maximum queue size for ABR should be at least 16 k at the ingress side. When the queue length passes a defined threshold, the congestion level, the queue is said to be congested and action must be taken to reduce the Explicit Rate. This threshold could be set to 8 k cells. (A higher threshold, e.g., 12 k cells, defines a Heavy Congested state in which the Explicit Rate must be reduced even more.)

The 1 ms period will thus give an uncertainty of the threshold level (when detected by the server) of about 28%. This can be considered acceptable. In normal cases, the ABR traffic is much below 622 Mbit/s.

For the egress port, each per link queue should have a threshold that is dependent on the number of links used. For four links, a threshold of 4 k may be suitable. The 1 ms period will in an extreme case result in an uncertainty of 38%, but normally, the uncertainty is far below that.

The total number of ABR cells (taken over all links) at the egress side could also be supervised in order to allow for statistical multiplexing of the buffer space (the sum of the congestion levels for each per link queue could be higher than the congestion level for the total number of ABR cells queued). This will give the side affect that a congested link may reduce the ABR traffic on the other links.

Figure 6:
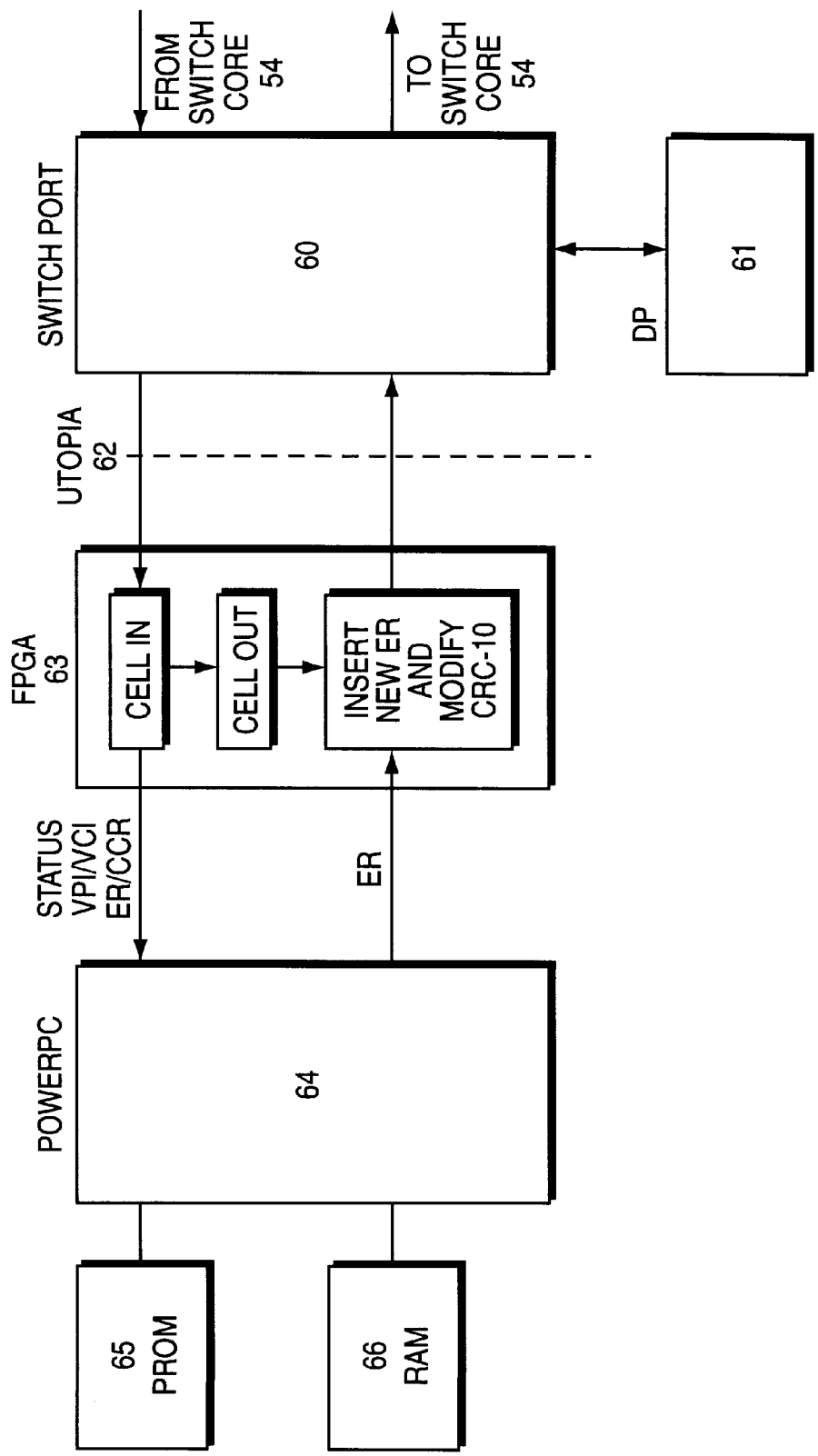
FIG. 6 is a schematic diagram of one example ABR server embodiment according to the present invention.

A block diagram for an example ABR server according to one embodiment of the present invention is shown in FIG. 6.

In FIG. 6, components 60–66 represent the block diagram components for the ABR server 55. At the right portion of FIG. 6, the ABR server components 55 of FIG. 6 communicate with the switch core 54 (shown in FIG. 5).

The ABR server 55 connects to the switch core 54 via a switch port 60, which controls the inflowing and outflowing cell streams from the ABR server 55. As described above, the cell streams to the switch port 60 may be of the Resource Management type. If they are of the RM type (as determined) according to FIG. 5a, the cell will be received by the switch port 60 for routing to and processing by the ABR server 55. The switch port 60 communicates with a Field Programmable Gate Array (FPGA) 63 through a Utopia interface 62. The FPGA 63 communicates with a microprocessor 64, which has associated ROM 65 and RAM 66.

Also communicating with the switch port 60 is a data processor 61.

The components 60–66 of the ABR server 55 should be viewed in a functional rather than in a hardware sense. Thus, the component 60–66 may be singular components, or can be incorporated into one common component, or a few components, or may be incorporated in software. The operation of the components 60–66 that comprise the ABR server 55 are now described in greater detail.

The switch port in the ABR server will receive forward and backward Resource Management cells from all ingress switches on separate channels. The switch port will add a virtual path identifier that gives the server direct information on the source (ingress switch port) of the cell. The header 12 also indicates if the cell is a forward or backward Resource Management cell. As an example, a forward Resource Management cell from switch port 4 may have VPI=4, and VCI=0–1024, and a backward Resource Management cell will have VPI=20. This is a simple coding that will simplify the server somewhat.

The load of the server 55 can be calculated from the number of Resource Management cells occurring in the cell stream. For example, if one Resource Management cell in each direction is received for each of 32 user cells, the load of the server will be $2*\frac{1}{32}*15*622$ Mbit/s=580 Mbit/s. If the server cannot handle this capacity, the ABR capacity can be reduced, either by reducing the number of access boards, or by reducing the maximum ABR load of each link.

When a forward Resource Management cell is received, the cell is sent to the destination without modification, but the current cell rate value is first extracted and used in the ABR algorithm. To do this, the cell is fed from the output of the switch port 60 (Utopia side) to the input. A table look-up in the switch port 60 will take the VPI/VCI value and find a channel number, a routing tag and the outgoing VCI. From this, the switch port 60 can route the forward cell onto its destination.

A received backward Resource Management cell shall be sent to the destination after modification of the explicit rate value, as described below. Separate explicit rate values are calculated for each ingress switch port and each egress link.

The modified explicit rate value is:

min(ER in cell, ER for ingress switch port, ER for egress link)

[Note: ingress and egress relative to the forward direction]

The backward Resource Management cell is also then sent onto its destination by taking it from the output of the switch port 60 and feeding it to the input after removal of the most significant VPI bit (done in the FPGA 63). It is then sent on the same channel as the forward Resource Management cell.

The FPGA 63 has two Utopia interfaces, one in each direction, and a PowerPC 64 interface. It must be able to store two ATM cells, extract VCI/VPI and explicit rate/current cell rate, insert new VCI/VPI and explicit rate, and modify the CR-10 value in the cell. Alternatively, the modification could be done in the PowerPC 64. As an example, the Utopia clock should be 40 Mbit/s, or whatever the FPGA 63 and/or PowerPC 64 other clock rate is appropriate for.

When an Resource Management cell reaches the FPGA 63, the VPI and the ten least significant bits of the VCI are extracted. If it is a backward cell (decoded from the VPI number), the explicit rate value is extracted, and if it is a forward Resource Management cell, the current cell rate value is extracted. When enough of the cell has been received in order to extract these values, an interrupt is given to the PowerPC 64 The complete cell is then stored in a cell buffer inside the FPGA.

If the cell was a backward Resource Management cell, the new explicit rate value is supplied to the FPGA from the PowerPC 64. Then, during the next cell interval, this backward cell is sent back into the port and a new cell is received from the port and placed in another buffer. Two buffers in the FPGA 63 thus alternate in every other cell from the port.

The PowerPC 64 may use one of many different algorithms for calculating the explicit rate value, and the present invention is not limited to any one such algorithm. Several appropriate algorithms have been described within the ATM Forum. A simple version is the EPRCA algorithm, that is described below. The input data for this are the current cell rate values from the forward Resource Management cells and the buffer status (congested/non-congested) for all ingress ports and outgoing links. These congestion states are sent to the server in separate control cells at regular intervals. A pseudo code for the PowerPC may look like this (with emphasis on the Resource Management cell handling portion, not the status cell handling portion):

```
/*read direction, VPI/VCI and CCR/ER (in one 32 bit word)*/
indata=read_from_fpga0;
/*check if this is a forward or backward RM cell*/
if(indataI[VPI_bit12]-FORWARD) {
    /*the incoming VPI gives directly the incoming port
      The VPI(VCI (4+10 bits) is used to address a connection
      table that gives the outgoing link (8 bits).
      Extract VPI and VCI by mask and shift*/
    Port_in=extract_VPI(indata);
    Table_address=extract_VPI/VCI(indata);
    Link_out=Table_look_up_fw(Table_address);
    /*Extract CCR and update MACR for Port_in and link_out.
      Convert CCR to linear code*/
    CCR=extract_CCR(indata);
    CCR=decode(CCR);
    MACR[Port_in]=15*MACR[Port_in]/16 + CCR/16;
    MACR[link_out]=15*MACR[link_out]/16 + CCR/16;
} else {
    /* Backward RM cell.
    The incoming VPI gives directly the incoming port
    The VPI/VCI (14 bits) is used to address a connection
    table that gives the incoming link (4 bits), and
    outgoing port (4 bits).
    Extract VPI and VCI by mask and shift*/
    Port_in=extract_VPI(indata);
    Table_address=extract_VPI/VCI(indata);
    Table_data=Table_look_up_bw(Table_address);
    QPort_out=extract_Port_out(Table_data);
    Link_in=extract_link_in(Table_dataI);
    /* Extract ER, compare with ER for incoming link and
      outgoing port. Write the lowest into FPGA after
      conversion to floating code. */
    ER=extract_ER(indata);
    ER=decode(ER);
    if(State(Port_out)=CONGESTED)
        ER=min(ER_in_cell,MACR(Port_out)*7/8;
    if(State(link_in)=CONGESTED)
        ER=min(ER,MACR(link_in)*7/8);
    if(State[Port_out]=HEAVY_CONGESTED)
        ER=min(ER_in_cell, MACR{Port_out]*3/4;
    if(State[Link_in]=HEAVY_CONGESTED)
        ER=min(ER_in_cell, MACR[Link_in]*3/4;
    ER=code(ER);
    write_in_FPGA(ER);
};
```

The PowerPC program and MACR values (Mean Allowed Cell Rate) can be held in the internal cache of the PowerPC so that no external accesses are needed. The MACR values are updated every time a forward cell is received. One MACR value exists for each ingress port and for each outgoing link. These MACR values are stored in a table and are addressed using indices. The look-up table must be stored in an external RAM 66. A 100 MHz clock will give about 68 clock cycles for each cell at 622 Mbit/s which is enough to execute the code above.

The preferred structure is non-redundant, but the invention can alternatively employ redundancy. For redundancy, two servers 55 are employed. If one fails, all channels from the ATBs must be rerouted to the stand-by server, by updating the routing tables in every ingress port. In the opposite direction, the stand-by server can set up connections at the same time as the active server, and have the outputs to the switch core disabled. The stand-by server must also be updated with new MACR values at regular intervals from the active server, which requires a communication link between the servers (a separate link, or via ATM connections).

Another alternative method within the context of the redundant system would be to set up point-to-multipoint connections from the ingress switch port to the two servers.

As all Resource Management cells are switched from the server to the destination as an individual channel, the total number of ABR channels in the complete system is limited. For example, in the 16 k queue size embodiment described above, the total channels is limited to 16K. The invention according to the above-described example embodiments assumes that each switch port can use 1K of these channels (for a 10 Gbit/s switch). However, more VCI bits can be used in the table look-up, e.g., 12 bits, so that each ATB can support up to e.g., 4K ABR channels.

This channel number limitation can be eliminated if the Resource Management cells are switched as virtual channels from the ingress port to the server, and where the outgoing VCI is placed in the cell already at the ingress side (no VCI translation in the server). This will, however, reduce the total number of channels per ATB by three times the number of used ABR channels, i.e., total number of channels=16 k–(3* number_of ABR_channels). If the server FPGA 63 can decode the type of Resource Management cell from the payload, the same channel can be used for both forward and backward Resource Management cells, so the number of extra channels required are the same as the number of ABR channels.

The proposed example embodiment described above assumes that only virtual channels are used for ABR, not virtual paths. The method could be modified for virtual paths.

The present invention is not, of course, limited to any particular switch bandwidth. For example, in a 20 Gbit/s switch, one ABR server can only handle 50% ABR traffic (with Nrm=32), and in total 16K ABR channels. If this is not acceptable, servers of greater capacity can be substituted, or multiple parallel servers can be used. In the 16K embodiment, each server could handle the Resource Management cells coming from 16 of the ATB boards, but must get status information from all of the ATB boards (16* number of servers). A convenient way of doing this is to set up a multicast connection from each ATB to the multiple server boards for the status information. Two server boards, for example, will support in total 32K ABR channels (16K per group of 16 ATB boards).

The device processor 71 (FIG. 7) operates as follows. It will get an interrupt every millisecond. The following C-like code shows a possible interrupt routine However, it should be coded in assembler in order to minimize the execution time.

```
/*  In this example, the access board has eight links. Every interrupt,
    the status of four of these (egress) links are checked, together with
    the status of the ABR service class taken over all (egress) links.
    The status of the ingress ABR service class is also checked (taken
    over all VCs). Each check is performed by comparing the queue
    length with two configured values, Congestion_level
    and Heavy_congestion_level. The status is transferred
    to the ABR server as a VCI value in a predefined VP channel.
    The coding is as follows:
    bit 0+1: status link 0 or 4 (not congested, congested, heavy
    congested)
    bit 2+3: status link 1 or 5
    bit 4+5: status link 2 or 6
    bit 6+7: status link 3 or 7
    bit 8+9: status egress ABR service class
    bit 10+11: status ingress ABR service class
    bit 13: links 0–3 or lines 4–7
    bits 14 and 15: not used */
int Linkgroups; /*=0 if this interrupt is reading from link 0–3. Save
this between interrupts*/
interrupt( ) {
int State_word; /*the collected states from all queues, to be used as
VCI*/
int i, state, st; /*temporary variables */
Linkgroups=~Linkgroups; /* read from next four links */
State_word=Linkgroups; /* will end up as bit 13 */
state=read_from_port(status[Ingress_ABR_SQ]);
state=mask_bit_15(state) /* remove the congestion state bit set by
port*/
st=NOT_CONGESTED
if(state>=Congestion_level_ingress) {
     if (state>=Heavy_congestion_level_ingress) st=
         HEAVY_CONGESTED;
     else st = CONGESTED;}
State_word=4* State_word + st; /* Shift State_word and add new
state*/
state=read_from_port(status[Egress_ABR_SQ]);
state=mask_bit_15(state)
st=NOT_CONGESTED
if(state>=Congestion_level__egress) {
     if(state>=Heavy_Congestion_level_egress) st=
         HEAVY_CONGESTED;
     else st=CONGESTED;);
State_word=4* State_word + st;
/* This loop reads status from the four links. It may be optimized and
even be omitted in order to save time (i.e. replicating the code four
times instead) */
link=Linkgroups*4+3; /* read links in reverse order */
for(i=0;i<4;i++,link--){
   state=read_from_port(status[ABR_SCQ[link]]);
   state=mask_bit_15(state);
   st= NOT_CONGESTED;
   if(state>=Congestion_level_SCQ) {
     if (state>=Heavy_congestion_level_egress_SCQ) st=
         HEAVY_CONGESTED;
          else st=CONGESTED;);
       State_word=4* State_word + st;
```

```
};
send_to_server(State_word) /*send the state word to the
server via a dedicated connection (the word is written to a
register in the switch port, which sends it on the
dedicated connection) */
}
```

In the above pseudo-code:
Ingress_ABR_SQ is a queue in the ingress port in which all ABR cells are queued
ABR_SCQ[link] is a queue in the egress port in which all ABR cells for a
certain link is queued
Egress_ABR_SQ is the sum of all ABR_SCQ in an egress port While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data cell transmission server for processing resource management cells associated with a stream of user cells routing from a source to a destination through a switch core via user stream virtual channels, said resource management cells carrying explicit cell rate information and current cell rate information and being characterized by either forward identifiers indicating their origin from the source or by reverse identifiers indicating their origin from the destination, the server comprising:

a switch port coupled to the switch core and adapted to communicate all resource management cells to and from the switch core and the server; and an explicit rate code adjuster disassociated with the stream of user cells and adapted to receive the resource management cells from the switch core via a special virtual channel different from the user stream virtual channels, the adjuster adapted to read a header of all said resource management cells to determine whether they have forward identifiers or reverse identifiers, and if a resource management cell has a forward identifier, said adjuster reading said current cell rate information and routing said resource management cell with said forward identifier via the port to the destination, and if a resource management cell has a reverse identifier, said adjuster reading the explicit cell rate information from said resource management cell with said reverse identifier, processing said explicit cell rate into a modified explicit cell rate using a flow control algorithm executed independent of said switch core, substituting the modified explicit cell rate into the resource management cell having the reverse identifier, and routing said resource management cell with said reverse identifier and said modified explicit cell rate to the switch core for delivery to the source.

2. A data cell transmission server as in claim 1, further including a cell processor communicating with the port through a utopia interface.

3. A data cell resource management transmission server as in claim 1, wherein the adjuster modifies the cells having reverse identifiers by removing and replacing the explicit cell rate information from the reverse rate management cells.

4. A data cell transmission server as in claim 3, wherein the adjuster modifies the explicit cell rate information in the reverse resource management cells based on information obtained from the resource management cells having forward identifiers and on queue congestion information received from the switch port.

5. A data cell transmission server as in claim 4, wherein the information obtained from the resource management cells having forward identifiers includes the current cell rate.

6. A method of processing resource management cells associated with a stream of user cells routing from a source to a destination through a switch core, said resource management cells carrying explicit cell rate information and current cell rate information and being characterized by either forward identifiers indicating their origin from the source or by reverse identifiers indicating their origin from the destination, comprising the steps of:

1) receiving the stream of user cells on a first set of virtual channels;
2) receiving at a separate server resource management cells from the switch core via a second virtual channel different from the first set of virtual channels;
3) reading a header of said received resource management cells to determine whether they have forward identifiers or reverse identifiers;
4) if a resource management cell has a forward identifier, reading said current cell rate information and routing said resource management cell with said forward identifier to the destination;
5) if a resource management cell has a reverse identifier:
   a) reading the explicit cell rate information from said resource management cell with said reverse identifier,
   b) processing said explicit cell rate information into a modified explicit cell rate,
   c) substituting the modified explicit cell rate into said resource management cell rate,
   d) routing said resource management cell with said reverse identifier to the switch core via the second virtual channel; and
   e) routing said resource management cell with said reverse identifier and said modified explicit cell rate through the first set of virtual channels toward the source.

7. A method of processing according to claim 6, wherein step 5) further includes communicating the resource management cell having reverse identifiers across a utopia interface.

8. A method of processing according to claim 6, wherein step 5) includes modifying the resource management cells having reverse identifiers by removing and replacing an explicit cell rate information value from the resource management cells.

9. A method of processing according to claim 6, wherein step 5) includes modifying explicit cell rate information in the resource management cells having reverse identifiers based on information obtained from corresponding ones of the resource management cells having forward identifiers and on queue congestion information received from the origin.

10. A method of processing according to claim 9, wherein the information obtained from the corresponding ones of the resource management cells having forward identifiers includes the current cell rate.

* * * * *